UNITED STATES PATENT OFFICE.

OTTO SCHMIDT, OF MANNHEIM, GERMANY, ASSIGNOR TO BADISCHE ANILIN & SODA FABRIK, OF LUDWIGSHAFEN-ON-THE-RHINE, GERMANY, A CORPORATION.

CHLOR-ARALKYL-SULFO-CHLORIDS AND PROCESS OF MAKING THEM.

1,027,908. Specification of Letters Patent. Patented May 28, 1912.

No Drawing. Application filed March 23, 1911. Serial No. 616,449.

*To all whom it may concern:*

Be it known that I, OTTO SCHMIDT, Ph. D., chemist, subject of the King of Prussia, residing at Mannheim, Germany, have invented new and useful Improvements in Chlor-Aralkyl-Sulfo-Chlorids and Processes of Making Them, of which the following is a specification.

In the specification of British Letters Patent No. 29,717 A. D. 1896 it is stated that by treating toluene sulfochlorid with chlorin, the sulfonic group is split off and chlorin derivatives of toluene are obtained. I have now found that I can obtain the hitherto unknown chlor-aralkyl-sulfochlorids containing chlorin in the alkyl group by reacting with chlorin on aralkyl-sulfochlorids in such manner that the sulfonic group is, as far as possible, not split off. I prepare these new compounds by treating the aralkyl-sulfochlorids with chlorin while avoiding injurious excess of chlorin, as such excess tends to split off the sulfonic group, and without using any such chlorin carrier as tends to effect the chlorination in the benzene ring instead of in the methyl group. As a rule the temperature at which the reaction is carried on can be varied within wide limits, provided the other conditions be suitably chosen. For instance excess of chlorin is more injurious at a higher temperature than at a lower temperature. The process of my invention may be carried out in the presence of phosphorus pentachlorid, or the like. In the aforesaid manner, for instance toluene-sulfochlorid can be converted into benzyl-chlorid-sulfochlorid and 1-chlor-2-methyl-benzene-4-sulfochlorid be converted into 1-chlor-2-chlormethyl-benzene-4-sulfochlorid, that is, chlor-benzyl-chlorid-sulfochlorid.

My new chlor-aralkyl-sulfochlorids are characterized by being colorless compounds, capable of distillation without decomposition under reduced pressure. Upon treatment with ammonia they give rise to chlor-aralkyl-sulfamids, and upon treatment with mild saponifying agents they yield chlor-aralkyl-sulfonic acids.

The conversion of the chlor-aralkyl-sulfochlorids into the corresponding chlor-aralkyl-sulfonic acids is not claimed in this specification, but forms the subject matter of another application Serial No. 616,448.

The following example will serve to illustrate further the nature of my invention and how it can be carried into practical effect, but the invention is not confined to this example. The parts are by weight: Add fifty parts of phosphorus pentachlorid to seven hundred and sixty-two parts of para-toluene-sulfochlorid, and then at a temperature of from one hundred and twenty to one hundred and forty degrees centigrade, pass three hundred parts of chlorin into the mixture in such a way that no chlorin escapes from the vessel. The reaction product can then be purified, either by recrystallization, or by subjecting it to distillation, in which case organic compounds free from sulfur and unaltered para-toluene-sulfochlorid first of all distil over. When the thermometer shows a temperature of one hundred and seventy degrees centigrade at a pressure of twenty millimeters, stop the distillation and crystallize the residue from ligroin, in order to purify the benzylchlorid-para-sulfochlorid. This can thus be obtained in the form of white needles which melt at from sixty-four, to sixty-five, degrees centigrade and which boil at one hundred and eighty-three to one hundred and eighty-five degrees centigrade at a pressure of fifteen millimeters. It is easily soluble in boiling ligroin. The reaction which takes place can be represented by the following equation:

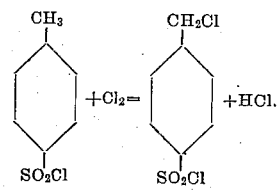

In this example, the addition of phosphorus pentachlorid is not absolutely necessary for the reaction to take place, and moreover the temperature can be varied as aforesaid, for instance the reaction can be carried out in the absence of phosphorus pentachlorid at a temperature of from seventy to eighty degrees centigrade. If desired, a diluent can also be employed.

In a similar manner, other chlor-aralkyl-sulfochlorids can be obtained, for instance 1-toluene-3-sulfochlorid yields 1-benzyl-chlorid-3-sulfochlorid, which consists of white crystals melting at sixty-five degrees centigrade and boiling at about one hundred and ninety degrees centigrade at a pressure of twenty-one millimeters; 2-chlor-1-toluene-4-sulfochlorid yields 2-chlor-1-benzyl-chlorid-4-sulfochlorid, which is a colorless oil boiling at from one hundred and eighty-five to one hundred and ninety degrees centigrade at a pressure of fifteen and a half millimeters; and 1-chlor-2-toluene-4-sulfochlorid yields 1-chlor-2-benzyl-chlorid-4-sulfochlorid, which consists of white crystals and has a boiling point of from one hundred and eighty-two to one hundred and eighty-six degrees centigrade at a pressure of fourteen millimeters.

Now what I claim is:—

1. The process of producing omega-chlor-aralkyl-sulfochlorids by treating aralkyl-sulfochlorids with chlorin while avoiding both an injurious excess of chlorin and such chlorin carrier as effects chlorination in the aromatic ring.

2. The process of producing benzyl-chlorid-para-sulfochlorid by treating para-toluene-sulfochlorid with chlorin while avoiding the presence both of an injurious excess of chlorin and a chlorin carrier such as effects chlorination in the aromatic ring.

3. As new articles of manufacture omega-chlor-aralkyl-sulfochlorids which in the pure state are colorless, are capable of distillation without decomposition under reduced pressure, on treatment with ammonia yield omega-chlor-aralkyl-sulfamids and on treatment with mild saponifying agents yield omega-chlor-aralkyl-sulfonic acids.

4. As a new article of manufacture benzyl-chlorid-para-sulfochlorid which when pure is colorless, boils without decomposition at about one hundred and eighty-four degrees centigrade at a pressure of fifteen millimeters of mercury, is easily soluble in boiling ligroin, yields with ammonia benzyl-chlorid-para-sulfamid, and on treatment with mild saponifying agents gives rise to benzyl-chlorid-para-sulfonic acid.

In testimony whereof I have hereunto set my hand in the presence of two subscribing witnesses.

OTTO SCHMIDT.

Witnesses:
J. ALEC. LLOYD,
S. H. SHANK.